United States Patent
Saito et al.

(10) Patent No.: US 9,309,428 B2
(45) Date of Patent: Apr. 12, 2016

(54) INK JET RECORDING METHOD FOR PRINTING PIGMENT

(71) Applicant: Seiko Epson Corporation, Tokyo (JP)

(72) Inventors: Toru Saito, Yamagata-mura (JP);
Tomoki Shinoda, Shiojiri (JP);
Masakazu Ohashi, Shiojiri (JP);
Masashi Kamibayashi, Matsumoto (JP);
Yoshihiro Watanabe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/730,890

(22) Filed: Jun. 4, 2015

(65) Prior Publication Data
US 2015/0267064 A1  Sep. 24, 2015

Related U.S. Application Data

(63) Continuation of application No. 14/190,584, filed on Feb. 26, 2014.

(30) Foreign Application Priority Data

Feb. 27, 2013 (JP) .................................. 2013-036776

(51) Int. Cl.
*G01D 11/00* (2006.01)
*C09D 11/322* (2014.01)
*B41J 2/135* (2006.01)
(Continued)

(52) U.S. Cl.
CPC ............ *C09D 11/322* (2013.01); *B41J 2/04581* (2013.01); *B41J 2/04588* (2013.01); *B41J 2/135* (2013.01); *D06P 5/00* (2013.01); *C09D 11/30* (2013.01); *C09D 11/324* (2013.01);
(Continued)

(58) Field of Classification Search
CPC ...... C09D 11/322; C09D 11/40; C09D 11/30; C09D 11/326; C09D 11/324; C09D 11/38
See application file for complete search history.

(56) References Cited

U.S. PATENT DOCUMENTS 4,698,642 A * 10/1987 Gamblin ......................... 347/42
5,879,439 A *  3/1999 Nagai ..................... C09D 11/32
                                                            106/31.28

(Continued)

FOREIGN PATENT DOCUMENTS

EP          2641943 A1 *  9/2013
JP         07-119048 A      5/1995
(Continued)

OTHER PUBLICATIONS

Volume and Capacity Conversion Table, http://www.sengpielaudio.com/calculator-milliliter.htm, p. 1.*

*Primary Examiner* — Lisa M Solomon
(74) *Attorney, Agent, or Firm* — Nutter McClennen & Fish LLP; John J. Penny, Jr.

(57) ABSTRACT

There is provided an ink jet recording method for printing a pigment in which a pigment printing ink composition including at least pigment as a colorant is discharged from a nozzle opening as an ink droplet having an amount of the ink of the ink droplet of 9 ng or less with an average discharging speed V of 5 m/s or greater at a distance in the range of 0.5 mm to 1.0 mm in the direction from the nozzle opening to cloth, and whereby the pigment printing ink composition is adhered to the cloth.

16 Claims, 3 Drawing Sheets

(51) Int. Cl.
  *B41J 2/045*  (2006.01)
  *D06P 5/00*  (2006.01)
  *C09D 11/40*  (2014.01)
  *C09D 11/30*  (2014.01)
  *C09D 11/326*  (2014.01)
  *C09D 11/324*  (2014.01)
  *C09D 11/38*  (2014.01)

(52) U.S. Cl.
  CPC .............. *C09D11/326* (2013.01); *C09D 11/38* (2013.01); *C09D 11/40* (2013.01)

(56) References Cited

U.S. PATENT DOCUMENTS

| | | | |
|---|---|---|---|
| 5,882,390 A * | 3/1999 | Nagai | C09D 11/32 106/31.49 |
| 6,426,766 B1 | 7/2002 | Shirota et al. | |
| 6,598,950 B1 | 7/2003 | Hosono et al. | |
| 8,474,931 B2 | 7/2013 | Kondo | |
| 2005/0264627 A1* | 12/2005 | Kim | 347/92 |
| 2007/0037901 A1* | 2/2007 | Kanaya et al. | 523/160 |
| 2007/0173560 A1 | 7/2007 | Uozumi | |
| 2012/0154480 A1 | 6/2012 | Anthony et al. | |
| 2014/0240399 A1 | 8/2014 | Saito et al. | |

FOREIGN PATENT DOCUMENTS

| | | |
|---|---|---|
| JP | 2952133 B2 | 9/1999 |
| JP | 2005-263837 A | 9/2005 |
| JP | 2007-522285 A | 8/2007 |
| JP | 2010-031402 A | 2/2010 |
| WO | 2005/071026 A1 | 8/2005 |

* cited by examiner

INK JET RECORDING METHOD FOR PRINTING PIGMENT

The present application is a continuation application of U.S. patent application Ser. No. 14/190,584, filed on Feb. 26, 2014. Priority is claimed under 35 U.S.C. §119 to Japanese Application No. 2013-036776 filed on Feb. 27, 2013, which is hereby incorporated by reference in its entirety.

BACKGROUND

1. Technical Field

The present invention relates to an ink jet recording method for printing pigment.

2. Related Art

In the related art, various methods have been used as a recording method for forming an image based on image data signals on a recording medium such as paper. Among these, in an ink jet system, it is possible to efficiently use an ink composition and running cost is low since the ink jet system is not expensive and the ink composition is discharged onto only the necessary image portion to directly form an image on the recording medium. Furthermore, the ink jet system makes little noise and therefore, it is excellent as a recording method.

In recent years, applying an ink jet recording system to dyeing of a cloth (textile printing) has been studied. For example, an ink jet ink composition is disclosed in which in order to provide a durability and a color fastness against washing to a textile which is ink jet printed, an aqueous vehicle, a colorant and a crosslinked polyurethane dispersant are included (for example, refer to JP-T-2007-522285).

Furthermore, an ink set for ink jet printing is disclosed which is configured with respective ink jet printing inks of yellow, magenta, cyan or blue and black containing at least a disperse dye, a dispersant, water and a water-soluble organic solvent in order to provide an ink set for ink jet printing by which a stable image with respect to a change in the drying conditions of a printed cloth is obtained (for example, refer to JP-A-2005-263837).

Furthermore, a method is disclosed in which printing is performed by applying ink of at least two colors of orange and red on a cloth using an ink jet system in order to provide an ink jet printing method in which a printed matter having a particularly wide color reproduction range from orange to scarlet can be obtained, and a stable image can be obtained even when dyeing treatment conditions by heating vary to some extent when an ink jet printing is performed on a cloth configured with mainly fibers capable of being dyed with a disperse dye (for example, refer to Japanese Patent No. 2952133).

In addition, an ink jet printing method is disclosed in which printing is performed such that a discharging speed of ink droplets from a nozzle and the mass of the ink droplets satisfy a predetermined relation, in a method in which ink droplets are continuously discharged from the nozzle by applying pressure to the ink whereby printing is performed on a cloth in order to provide an ink jet printing method in which the scattering of ink is suppressed and a high quality image without contamination can be printed in the case of printing on a cloth in a continuous ink jet system such as a charge amount deflection type ink jet (for example, refer to JP-A-7-119048).

However, in the above-described related art, there are problems in that if reducing an amount of the ink of the ink droplet in order to obtain an image with a higher resolution and a higher image quality, or to further increase a drying speed, ink droplets are likely to remain on fuzz (hereinafter, simply referred to as "fluff") of the cloth surface, and at the time of heat press, fluff collapses to contact the base portion of the cloth, the ink droplets remaining in the fluff adhere to the base portion of the cloth and contaminate the cloth, and as a result, cohesion unevenness and bleeding occur. In addition, there is also a problem in that in the case of a dye printing ink composition, ink is unlikely to adhere to the base portion of the cloth even in the case where the fluff collapses since the coloring material of the ink attached to the surface of the fluff is likely to penetrate into the inside of the fluff. However, in the case of a pigment printing ink composition (hereinafter, simply referred to as "ink composition"), ink remaining on the surface of the fluff at the time when the fluff collapses is likely to attach to the base portion of the cloth to contaminate the cloth since the pigment attached to the surface of the fluff is unlikely to penetrate into the inside of the fluff.

In addition, there is also a problem in that in the case where ink droplets do not reach the base portion of the cloth since the ink droplets are attached to the fluff, a concealing property of an image becomes poor.

SUMMARY

An advantage of some aspects of the invention is to provide an ink jet recording method for printing a pigment in which contamination of a cloth is suppressed and a concealing property and a drying speed of the obtained image are excellent.

The present inventors performed thorough studies. In ink jet printing of a pigment printing ink composition on the cloth, in the case of printing after setting the amount of the ink per one ink droplet to be small, there are advantages in that an image with a high-resolution and a high image quality can be obtained, or the drying speed can be increased. In contrast, ink droplets are unlikely to reach the base portion of the cloth since the ink droplets adhere to the fluff compared with a case where the amount of the ink per one ink droplet is large, and there is a problem in that image quality is likely deteriorated by collapse of the fluff at the time of a heat press after ink is applied. The inventors have found that by setting the amount of the ink droplets to a predetermined amount and setting the speed to a predetermined speed, it is possible to suppress adhesion of the ink droplets to the fluff and to make ink droplets reach the base portion of the cloth and the problems can be solved, and have completed the invention.

That is, the invention is as follows.

[1] An ink jet recording method for printing a pigment, in which a pigment printing ink composition including at least pigment as a colorant is discharged from a nozzle opening as an ink droplet having an amount of an ink of 9 ng or less with an average discharging speed V of 5 m/s or greater at a distance in the range of 0.5 mm to 1.0 mm in the direction from the nozzle opening to cloth, and the pigment printing ink composition adheres to the cloth.

[2] The ink jet recording method for printing a pigment described in [1], in which the distance between the nozzle opening and the cloth is in the range of 2.0 mm to 5.0 mm.

[3] The ink jet recording method for printing a pigment described in [1] or [2], in which the amount of the ink of the ink droplet is 5.9 ng, and the average discharging speed V is in the range of 5 m/s to 10 m/s.

[4] The ink jet recording method for printing a pigment described in any one of [1] to [3], in which the solid content of the pigment printing ink composition is 8% by mass or greater.

[5] The ink jet recording method for printing a pigment described in any one of [1] to [4], in which the pigment printing ink composition includes a pigment, and a resin dispersion.

[6] The ink jet recording method for printing a pigment described in any one of [1] to [5], in which the cloth includes cotton or a cotton blend.

[7] The ink jet recording method for printing a pigment described in any one of [1] to [6], in which after the pigment printing ink composition is adhered to the cloth, the cloth to which the pigment printing ink composition is adhered is heat-treated by a heat press.

[8] The ink jet recording method for printing a pigment described in [7], in which a heating temperature is 150° C. or higher in the heat treatment.

[9] The ink jet recording method for printing a pigment described in any one of [1] to [8], in which the amount of the pigment printing ink composition adhering to the cloth is in the range of 10 mg/inch$^2$ to 70 mg/inch$^2$.

[10] The ink jet recording method for printing a pigment described in any one of [1] to [9], in which a dot formation density of the pigment printing ink composition on the cloth is 720 dpi or greater×720 dpi or greater.

[11] The ink jet recording method for printing a pigment described in any one of [1] to [10], in which the pigment printing ink composition is any one of a color ink including at least color pigment as a pigment and a black ink including at least carbon black pigment as a pigment.

[12] An ink jet recording apparatus, in which recording is performed by the ink jet recording method for printing a pigment described in any one of [1] to [11].

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments for carrying out the invention (hereinafter, referred to as "the embodiment") will be described in detail. Further, the invention is not limited thereto, and various modifications are possible without departing from the gist of the invention.

1. Ink Jet Recording Method for Printing Pigment

In the ink jet recording method for printing a pigment of the embodiment, a pigment printing ink composition including at least pigment as a colorant is discharged from a nozzle opening as an ink droplet having an amount of the ink of the ink droplet of 9 ng or less, with an average discharging speed V of 5 m/s or greater at a distance in the range of 0.5 mm to 1.0 mm in the direction from the nozzle opening to cloth, and whereby the pigment printing ink composition is adhered to the cloth.

1. Discharging Method

Figure 1:
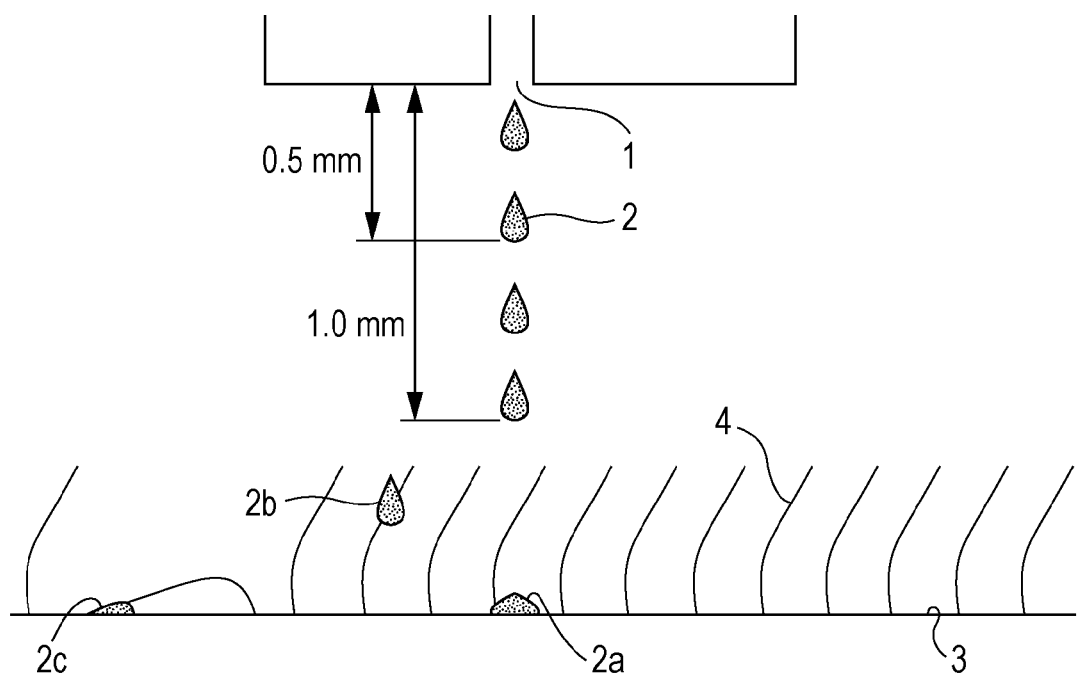
FIG. 1 is a schematic diagram for showing a progress in which ink droplets discharged from a nozzle opening are adhered to a cloth.

In FIG. 1, a progress in which ink droplets discharged from the nozzle opening are adhered to cloth is shown. It is desirable that an ink droplet 2 discharged from a nozzle opening 1 reach the base portion 3 of the cloth without adhering to fluff 4 (ink droplet 2a). However, in the related art, there is a case where the ink droplet 2 does not reach the base portion 3 of the cloth since the ink droplet 2 is adhered to the surface of the fluff 4 (ink droplet 2b), or there is a case where the ink droplet 2b adhering to the surface of the fluff 4 is adhered to the base portion 3 of the cloth at the time when the fluff 4 collapses to contaminate the cloth (ink droplet 2c). The ink jet recording method for printing a pigment of the embodiment has a configuration in which ink droplet 2 discharged from the nozzle opening 1 reaches the base portion 3 of the cloth without adhering to the surface of the fluff 4. The configuration is as follows.

The amount of an ink droplet of the pigment printing ink composition discharged from the nozzle opening is 9 ng or less, preferably in the range of 1 ng to 9 ng and more preferably in the range of 5 ng to 9 ng. When the amount of the ink is in the above range, the image with high resolution with high drying speed and excellent discharging stability is obtained. The amount of the ink droplet of the pigment printing ink composition can be controlled by a discharging mechanism described later.

The average discharging speed V of the ink droplet of the pigment printing ink composition at a distance in the range of 0.5 mm to 1.0 mm in the direction of the cloth from the nozzle opening is preferably 5 m/s or greater, more preferably in the range of 5 m/s to 15 m/s, and still more preferably in the range of 5 m/s to 10 m/s. When the average discharging speed V is in the above range, contamination of a cloth is inhibited and the discharging stability is excellent. The average discharging speed V can be controlled by a discharging mechanism described later. Moreover, as shown in FIG. 1, images of the ink droplet 2 are captured with a camera or a video camera from a side of the nozzle surface until the ink droplet 2 discharged from the nozzle opening 1 passes through a distance in the range of 0.5 mm to 1.0 mm, the time when the ink droplet 2 passes through the distance in the range of 0.5 mm to 1.0 mm in the direction of the cloth from the nozzle opening 1 is measured, and the average discharging speed V can be determined by calculating from the measured values.

In addition, the amount of the ink of the ink droplet is preferably in the range of 5 ng to 9 ng and the average discharging speed V is preferably in the range of 5 m/s to 10 m/s. There is a possibility that the discharging speed at the time point at which the ink droplet lands on a cloth is slower than at the time of discharging due to air resistance, and at least, when the amount of the ink of the ink droplet and the average discharging speed are in the ranges, the contamination of the cloth can be inhibited.

The distance between the nozzle opening and the cloth is preferably in the range of 0.5 mm to 1.0 mm, more preferably in the range of 2.0 mm to 5.0 mm, still more preferably in the range of 2.0 mm to 4.0 mm, and particularly preferably in the range of 2.5 mm to 4.0 mm. When the distance between the nozzle opening and the cloth is in the above range, contact with the nozzle surface tends to be suppressed and the contamination of a cloth tends to also be inhibited even in a case where cloth which absorbs the ink composition during printing expands. In addition, when the distance between the nozzle opening and the cloth is in the above-described range or less, it is to possible to reduce mist since a width of deviation from the target landing position of the ink droplet is reduced, and disturbance does not occur in the image and the ink droplet is likely to reach the cloth.

Here, "distance between the nozzle opening and the cloth" is a distance before recording is performed, and as shown in FIG. 1, it is a distance between the surface of the base portion 3 of the cloth (cloth from which the fluff 4 is removed) and the nozzle opening 1. On the other hand, even in the case where the cloth expands with respect to the nozzle surface due to printing in the case where the adhered ink amount is particularly large in the printing, a maximum expansion amount is about 2 mm.

Discharging Mechanism

An ink jet recording apparatus moves the head along the main scanning direction and discharges ink droplets from the nozzle openings of the head in conjunction with the movement, thereby recording an image on a recording medium. For example, the discharging of the ink droplets is performed by inflating and deflating a pressure generating chamber which communicates with the nozzle openings.

For example, the inflating and deflating of the pressure generating chamber is performed by using the deformation of a piezoelectric transducer. In such a head, the piezoelectric transducer is deformed depending on the driving pulse to be supplied, and by this, the volume of the pressure chamber changes, and a pressure change is generated in the ink composition in the pressure chamber by the volume change, whereby ink droplets are discharged from the nozzle openings.

In such an ink jet recording apparatus, a driving signal which is formed by connecting a plurality of driving pulses in series is generated. On the other hand, print data including gradation information is transmitted to the head. Then, only the required driving pulse is selected from the driving signal and the selected driving pulse is supplied to the piezoelectric transducer on the basis of the transmitted print data. Thus, the amount of the ink droplets discharged from the nozzle openings changes depending on the gradation information.

More specifically, for example, in the ink jet recording apparatus in which the four gradation formed of non-recording print data, small dot print data, medium dot print data and large dot print data are set, the ink droplets having the different amounts of the ink are discharged depending on each gradation.

Figure 2:
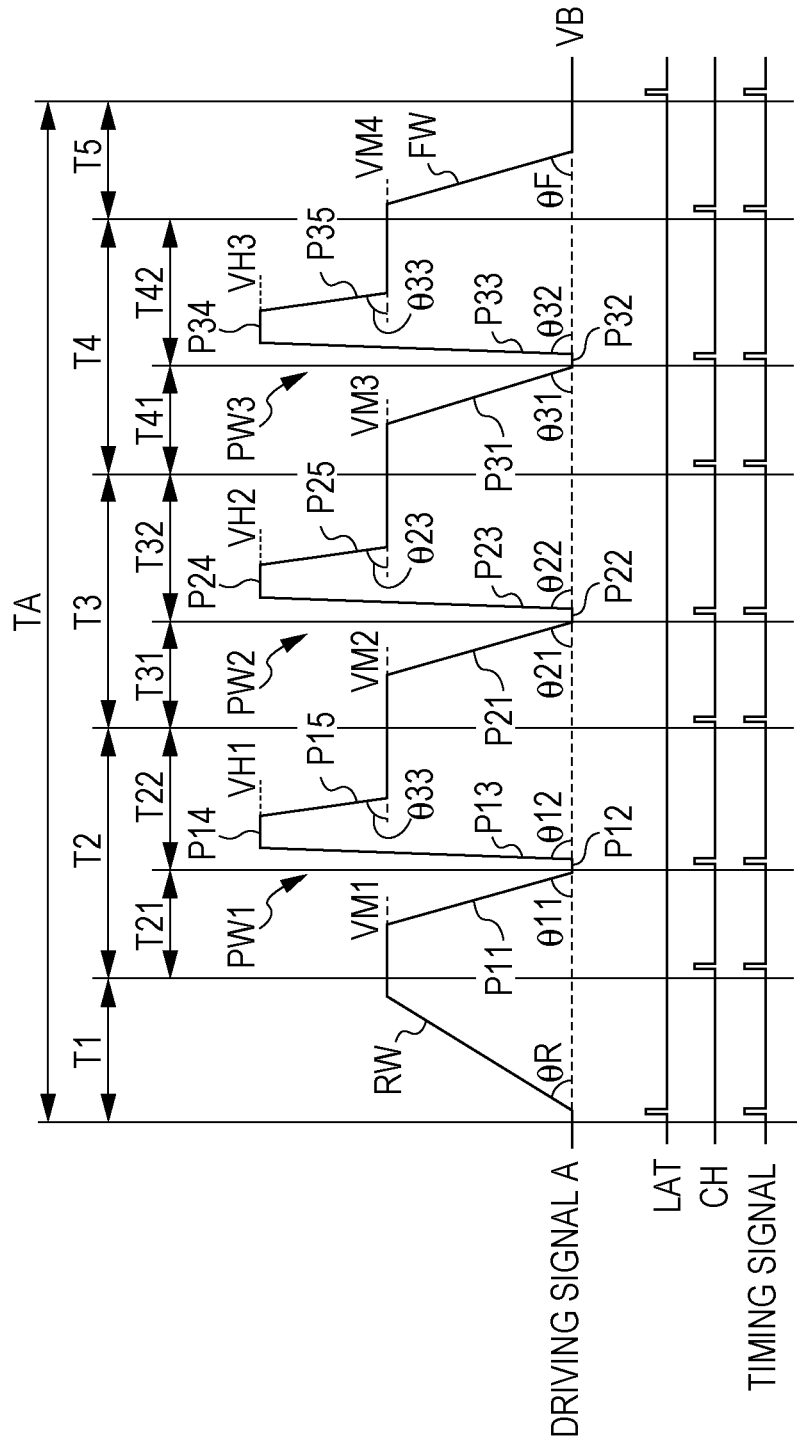
FIG. 2 is a view showing an example of a waveform of a driving signal for driving a head.

In order to realize the above-described arbitrary gradation recording, for example, a driving signal as shown in FIG. 2 can be used. As shown in FIG. 2, a driving signal A connects a potential raising waveform RW which is arranged in the period T1, a first pulse waveform PW1 which is arranged in the period T2, a second pulse waveform PW2 which is arranged in the period T3, a third pulse waveform PW3 which is arranged in the period T4 and a potential lowering waveform FW which is arranged in the period T5 in series, and it is a pulse-train waveform signal which is repeatedly generated with a recording period TA.

Potential raising waveform RW is waveform which linearly raises a potential with a gradient $\theta R$ from a base potential VB to a first driving potential VM1. The base potential VB is a ground potential. Pulse waveforms PW1, PW2 and PW3 have discharging elements P11, P21 and P31 which lower the potential from driving potentials VM1, VM2 and VM3 to a base potential VB with gradients $\theta 11$, $\theta 21$ and $\theta 31$, holding elements P12, P22 and P32 which maintain the base potential VB for a short period of time, charging elements P13, P23 and P33 which raise the potential from the base potential VB to the highest potentials VH1, VH2 and VH3 with gradients $\theta 12$, $\theta 22$ and $\theta 32$ in a short period of time, holding elements P14, P24 and P34 which maintain the highest potential, and discharging elements P15, P25 and P35 which lower the potential from the maximum potentials VH1, VH2 and VH3 to potentials VM2, VM3 and VM4 with gradients $\theta 13$, $\theta 23$ and $\theta 33$.

These pulse waveforms PW1, PW2 and PW3 are respectively signals capable of independently discharging ink droplets. When these respective pulse waveforms are supplied to the piezoelectric transducer, ink droplets of the amount capable of forming small dots are discharged from the nozzle openings.

In this case, by increasing and decreasing the number of the driving pulses supplied to the piezoelectric transducer, gradation control can be performed. For example, small dots can be recorded by supplying one driving pulse, middle dots can be recorded by supplying two driving pulses, and large dots can be recorded by supplying three driving pulses.

Here, the middle potential VM shown in FIG. 2 is referred to as a bias voltage. The potential of the piezoelectric transducer is maintained in any state among the lowest potential VL, the highest potential VH and the middle potential VM. By keeping such an intermediate state as the state at the time of starting the driving, a volume change can be generated on the expansion side and on the contraction side.

By adjusting the potential difference of the charging elements P13, 23 and 33, the amount of the ink per one ink droplet can be adjusted. Moreover, one recording cycle corresponds to the recording resolution, and one pixel is recorded in one recording cycle. In addition, by changing the gradients $\theta 12$, $\theta 22$ and $\theta 32$ of the charging elements P13, P23 and P33 of the driving pulses PW1, PW2 and PW3, the discharging speed can be adjusted.

Furthermore, for example, when six driving pulses are applied to the piezoelectric element in one recording cycle, six ink droplets can be discharged. In this case, when the driving frequency of one recording cycle is set to 7.2 kHz, discharging frequency of this case becomes 43.2 kHz. In addition, in the case where the driving frequency of one recording cycle is set to 7.2 kHz, when there is an intention to set the discharging frequency to 21.6 kHz, an ink composition may be discharged by applying only three driving pulses to every other out of six driving pulses PAPS to the piezoelectric element. Similarly, when there is an intention to set the discharging frequency to 14.4 kHz, an ink composition may be discharged by applying only two pulses to every two out of six driving pulses to the piezoelectric element, whereby it is possible to control the discharging frequency.

Printer

Figure 3:
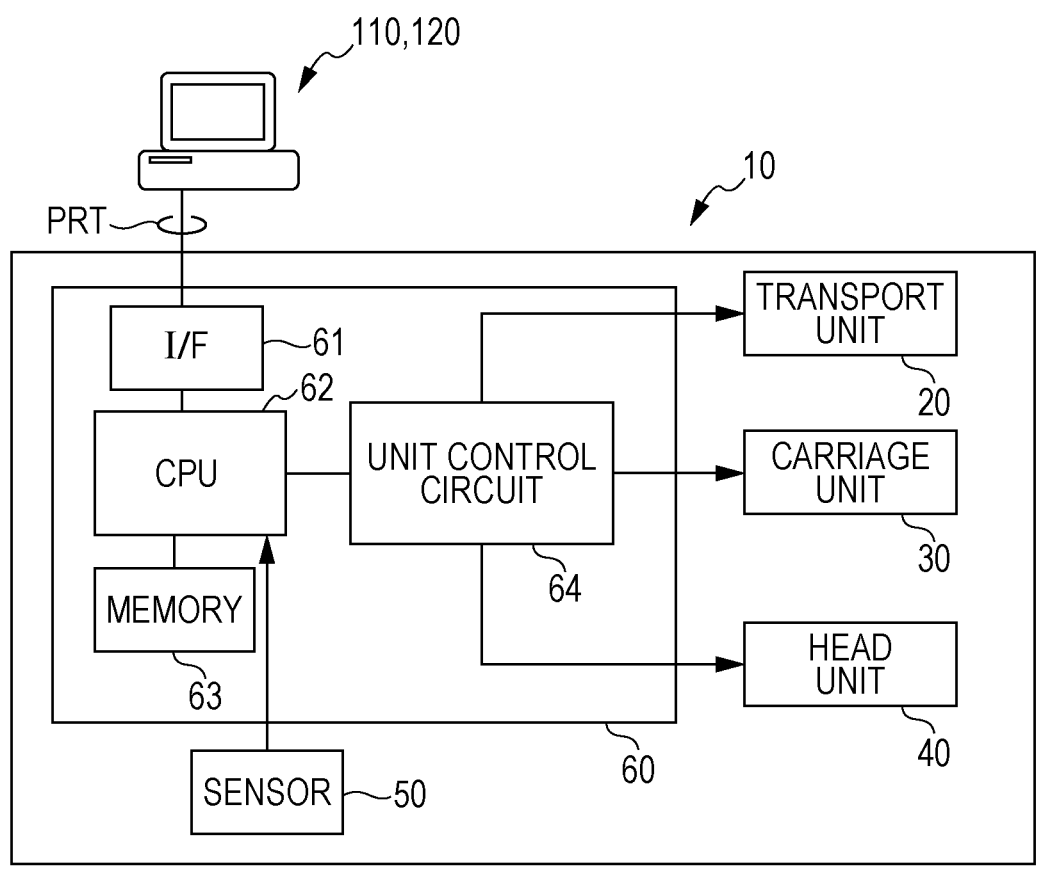
FIG. 3 is an example of a block diagram of an entire constitution of an (entire) ink jet recording apparatus.

FIG. 3 is an example of a block diagram showing an entire constitution of the (entire) ink jet recording apparatus which performs recording by the ink jet recording method of the embodiment. An ink jet printer 10 has a transport unit 20, a carriage unit 30, a head unit 40, a sensor group 50 and a controller 60. The ink jet printer 10 which receives a print signal PRT from a computer 110 having a display device 120 controls respective units by the controller 60 and performs recording on the recording medium. The controller 60 has a unit control circuit 64, a CPU 62, a memory 63 and an interface portion 61. The head unit 40 has the head and the discharging mechanism, and the discharging speed and discharging frequency at the time of recording, the amount of the ink and the like are adjusted by control of the head unit 40 by the controller 60. A carriage unit moves the head along the main scanning direction. A transport unit transports a recording medium in the transport direction.

2. Adhesion and Heat Treatment

In the ink jet recording method of the embodiment, an image is formed by a discharged pigment printing ink composition adhering to a cloth. After the pigment printing ink composition is adhered to the cloth, a drying step in which the cloth to which the pigment printing ink composition is adhered is heat-treated by a heat press is preferably performed. By the heat treatment, it is possible to fuse a resin (polymer) capable of being included in an ink composition on the surface of the cloth, and it is possible for water to evaporate. Thus, friction resistance of the obtained image tends to be more improved further. Moreover, in this case, contamination by the fluff is likely generated. However, in the method according to the embodiment, the contamination of the cloth can be suppressed since ink droplets reach the base portion of the cloth, and the ink droplets do not remain in the fluff.

As the heat treatments, which are not particularly limited, a heat press method, a normal pressure steam method, a high pressure steam method, and a thermofix method are exemplified. In addition, as the heat source of heating, which is not particularly limited, an infrared light (lamp) is exemplified. Further, the temperature at the time of heat treatment may be a temperature at which a resin (polymer) capable of being included in an ink composition can be fused and water can evaporate, is preferably 150° C. or higher, and is more preferably in the range of about 150° C. to 200° C. When the temperature at the time of heat treatment is in the above range, more excellent friction resistance tends to be obtained.

After the heating step, the cloth may be washed and dried. At this time, a soaping treatment, that is, a treatment of washing off a non-fixed pigment with a heated soap liquid may be performed as necessary.

In this manner, it is possible to obtain a recorded material in which an image derived from the ink composition of the embodiment is formed on the cloth. The recorded material has an excellent coloring property since generation of cracks, irregularities and dirt can be prevented, and also has excellent friction resistance since the fixation (adhesiveness) of an ink composition is excellent.

Adhered Amount of the Ink Composition

In addition, the lower limit of the adhered amount of the pigment printing ink composition with respect to the cloth is preferably 10 mg/inch$^2$ or greater and more preferably 20 mg/inch$^2$ or greater. The upper limit is preferable 100 mg/inch$^2$ or less, more preferably 70 mg/inch$^2$ or less, and still more preferably 50 mg/inch$^2$. When the adhered amount of the ink composition is in the above range, an image having a desired color by a color ink is likely formed, and the drying speed can also be improved.

Dot Formation Density

"Dot formation density" refers to a formation density of each ink droplet which is discharged on a recording medium, and is represented by the horizontal direction (main scanning direction, a width direction) of a recording medium×the vertical direction of a recording medium (sub-scanning direction, transport direction) (respective dpi). On the other hand, "recording resolution" refers to the density of the minimum recording unit (pixel) capable of controlling the gradation on the basis of the print data. In some cases, the dot formation density is the same as the recording resolution. However, it is not necessarily the same. The dot formation density of the pigment printing ink composition on a cloth is preferably 600 dpi or greater, more preferably 1200 dpi or greater, and still more preferably 1400 dpi or greater in both the directions. In the ink jet recording method for printing a pigment of the embodiment, the image can be printed at such a high dot formation density.

2. Cloth

Next, the cloth used in the embodiment will be described. As the cloth, which is not particularly limited, natural fibers or synthetic fibers such as silk, cotton, wool, nylon, polyester and rayon are exemplified. Among these, the cloth may include cotton or a cotton blend from the viewpoint of a sense of touch. In addition, in the case of cotton or cotton blended cloth, there is a tendency that ink droplets are unlikely to reach the cloth surface since the fluff is erect, and thus, the ink droplets are trapped thereby. For this reason, in the case of cotton or cotton blended cloth, the need to solve the problem by applying the invention is particularly great. The cotton blended cloth preferably includes cotton of 10% by mass or greater to less than 100% by mass, more preferably includes cotton of 30% by mass or greater to less than 100% by mass, and still more preferably includes cotton of 52% by mass or greater to less than 100% by mass. When the ratio of the cotton blended cloth is in the above range, the sense of touch tends to be further improved. In addition, as other fibers which are blended, which are not particularly limited, polyester and the like can be used.

3. Ink Jet Recording Method for Printing Pigment

The ink composition used in the embodiment is a pigment printing ink composition, and an aqueous pigment printing ink composition and an oil-based pigment can also be used. In the case where the ink is the pigment printing ink composition, the ink remaining on the surface of the fluff at the time when the fluff collapses is likely to be attached to the base portion of the cloth to contaminate the cloth since the pigment attached to the surface of the fluff is unlikely to penetrate into the inside of the fluff. In contrast, in the case where the ink composition is a dye printing ink composition, since the coloring material of ink composition is likely to penetrate into the inside of the fluff, the ink is unlikely to adhere to the base portion of the cloth even when the fluff collapses. On the other hand, when using the dye printing ink composition, a chemical treatment or a steam heat treatment is needed for fixing, and the dye needs to change according to the type of textures. However, when using the pigment printing ink composition, there are advantages in that only a post-treatment such as a heat treatment may be performed since the pigment is fixed by a fixing resin, and printing can be simply performed regardless of the type of textures. The contamination of the cloth can be suppressed while the advantage of the pigment printing ink composition is taken.

The pigment printing ink composition, which is not particularly limited, preferably includes a pigment and a resin emulsion, and more preferably further includes a water-soluble solvent. The fixation of a pigment tends to be further improved. In addition, when the ink composition includes the pigment and the resin emulsion, there is a tendency that the ink is more unlikely to penetrate into the fluff, and in such a case, the invention is particularly useful. Furthermore, a water-soluble resin can also be used as the resin emulsion, and even in this case, there is a tendency that the ink is more unlikely to penetrate into the fluff, and therefore, the invention is particularly useful. Hereinafter, the additives (components) which are included or can be included in the ink composition will be described in detail.

In the pigment printing ink composition, the upper limit of the solid content is preferably 5% by mass or greater, more preferably 8% by mass or greater, and still more preferably 10% by mass or greater. The lower limit of the solid content is preferably 25% by mass or less, more preferably 20% by mass or less, and still more preferably 15% by mass or less. When the solid content is in the above range, the concealing property, the friction resistance, storage stability, and the discharging stability of the obtained image tend to be improved. The solid content is included in the ink and is not volatilized when the ink is dried. The solid content is components which remain on a recording medium as a solid at room temperature over a long period of time after the ink is dried, and is components excluding water and organic solvents. Mainly, a coloring material, a resin and the like correspond to the solid content.

The pigment printing ink composition preferably includes the pigment of 0.5% by mass to 15% by mass, more preferably 1% by mass to 10% by mass, and still more preferably 1% by mass to 5% by mass. When the content of the pigment is in the above range, there is a tendency that the color development and the concealing property of an image are likely obtained.

1. Coloring Material

In the case where the adhered amount of the ink to the cloth as the color ink is small, there is a tendency that contamination is likely to be conspicuous if the fluff collapses. In addition, in the case of not applying a pretreatment liquid to the cloth before printing, there is a tendency that contamination is likely to occur by collapsing of the fluff when a heat press was performed. Therefore, the invention is particularly useful in the case where a pretreatment is not used, or in the case where the adhered amount of the ink is small (the case where an image is formed on white cloth by color inks and the like). However, it is not particularly limited to the above cases.

In the pigment printing ink composition used in the embodiment, coloring materials exemplified below can be used. As the carbon blacks, which are not particularly limited, furnace black, lamp black, acetylene black and channel black (C. I. Pigment Black 7) can be exemplified. Furthermore, as commercially available carbon blacks, No. 2300, 900, MCF88, No. 20B, No. 33, No. 40, No. 45, No. 52, MA7, MA8, MA100, No. 2200B (hereinbefore, product names, all manufactured by Mitsubishi Chemical Corporation), Color Black FW1, FW2, FW2V, FW18, FW200, 5150, 5160, 5170, pre-Tex 35, U, V, 140U, Special Black 6, 5, 4A, 4, 250 (hereinbefore, product names, all manufactured by Degussa AG), Conduct Tex SC, Raven 1255, 5750, 5250, 5000, 3500, 1255, 700 (hereinbefore, product names, all manufactured by Columbian Carbon Japan, Ltd.), Regal 400R, 330R, 660R, Mogul L, Monarch 700, 800, 880, 900, 1000, 1100, 1300, 1400, and Elf Tex 12 (hereinbefore, product names, all manufactured by Cabot Corporation) are exemplified. The respective inorganic pigments may be used alone, or two or more kinds may be used in combination.

As organic pigments, which are not particularly limited, quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perynone pigments, quinophthalone pigments, anthraquinone pigments, thioindigo pigments, benzimidazolone pigments, isoindoline pigments, azomethine pigments and azo pigments are exemplified. Specific examples of the organic pigment include the following.

As the pigments used in a cyan ink, C. I. Pigment Blue 1, 2, 3, 15, 15:1, 15:2, 15:3, 15:4, 15:6, 15:34, 16, 18, 22, 60, 65, 66, C. I. Vat Blue 4, 60 and the like are exemplified. Among these, at least one between C. I. Pigment Blue 15:3 and 15:4 is preferable.

As the pigments used in a magenta ink, C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, C. I. Pigment Violet 19, 23, 32, 33, 36, 38, 43, 50 and the like are exemplified. Among these, one or more types selected from the group formed of C. I. Pigment Red 122, C. I. Pigment Red 202 and C. I. Pigment Violet 19 are preferable.

As the pigments used in a yellow ink, C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, 213 and the like are exemplified. Among these, one or more types selected from the group formed of C. I. Pigment Yellow 74, 155 and 213 are preferable. Moreover, as pigments used in inks having colors other than those described above, that is, inks such as a green ink or an orange ink, known pigments in the related art are exemplified.

As the white pigments, which are not particularly limited, white inorganic pigments such as titanium oxide, zinc oxide, zinc sulfide, antimony oxide and zirconium oxide are exemplified. The white organic pigments such as white hollow resin particles or polymer particles can also be used instead of the white inorganic pigments.

As color indices (C. I.) of the white pigments, which are not limited, C. I. Pigment White 1 (basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), 23 (gloss white), 24 (alumina white), 25 (plaster), 26 (magnesium oxide and silicon oxide), 27 (silica) and 28 (anhydrous calcium silicate) are exemplified.

Among the pigments, in the case where color ink and black ink including at least one of color pigments and a carbon black pigment are used as a pigment, a color image and a black image can be recorded on a light color cloth such as a white cloth. Generally, when ink is adhered to a cloth, the ink penetrates into the cloth and thus, the color development of the image is reduced. However, in the case of printing on a light color cloth, for example, it is not necessary to apply a pretreatment agent, which aggregates the ink components by reacting with the ink components and as a result, inhibits penetration of the ink into the cloth, to the cloth before recording since the color development of the image is comparatively slightly reduced even if the ink penetrates into the cloth. In this case, since the heat press (heat press before adhesion of ink on cloth) for drying the pretreatment agent after applying the pretreatment agent is not performed, the fluff on the surface of the cloth is particularly large, and therefore, the invention is particularly useful.

2. Pigment Dispersion

The pigment may be present as a state in which the pigment is dispersed in the ink composition, that is, a pigment dispersion. Here, the pigment dispersion in the specification includes a pigment dispersing liquid and a pigment slurry (low-viscosity aqueous dispersion).

D50 of dispersion of a white pigment is preferably in the range of 100 nm to 600 nm and more preferably in the range of 200 nm to 500 nm. When the D50 is 100 nm or greater, both the concealing property and the coloring property tend to be improved. When the D50 is 1 μm or less, both the fixation of the ink and the discharging stability of the ink tend to be improved.

As the pigment dispersions, which are not particularly limited, a self-dispersing type pigment and a polymer-dispersing type pigment are exemplified.

2-1. Self-Dispersing Type Pigment

The self-dispersing type pigment is a pigment which can be dispersed or dissolved in an aqueous medium without a dispersant. Here, "disperse or dissolve in an aqueous medium without a dispersant" refers to a state where the pigment is stably present in an aqueous medium due to a hydrophilic group of the surface thereof even if a dispersant for dispersing the pigment is not used. For this reason, an ink in which foaming resulting from deterioration of a defoaming property caused by the dispersant practically does not occur, and which has excellent discharging stability tends to be easily prepared. In addition, since significant increase in the viscosity caused by the dispersant is sufficiently suppressed, more pigment can be contained, print density can be sufficiently increased, and therefore handling is easy.

The hydrophilic group is preferably a hydrophilic group of one or more types selected from the group formed of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$ and —NR$_3$.

Moreover, in these chemical formulas, M represents a hydrogen atom, an alkali metal, ammonium, a phenyl group which may have a substituent or an organic ammonium, and R represents an alkyl group having 1 to 12 carbon atoms or a naphthyl group which may have a substituent. In addition, M and R are selected independently of each other.

For example, the self-dispersing type pigment is manufactured by bonding (grafting) a hydrophilic group to the pigment surface by means of performing physical or chemical treatment to the pigment. As the physical treatments, a vacuum plasma treatment and the like are exemplified. In addition, as the chemical treatment, a wet oxidation method in which the pigment surface is oxidized by an oxidant in water and a method of bonding a carboxyl group via a phenyl group by means of bonding p-aminobenzoic acid to the pigment surface and the like are exemplified.

2-2. Polymer-Dispersing Type Pigment

The polymer-dispersing type pigment is a pigment which is dispersed by polymer dispersion. As the polymers used in the polymer-dispersing type pigment, which are not particularly limited, for example, the glass transition temperature (T$_g$) of the dispersion polymer used in the dispersion of the pigment is preferably 55° C. or lower, and more preferably 50° C. or lower. When the T$_g$ is 55° C. or lower, there is a tendency that the fixation of the ink can be improved.

In addition, the weight average molecular weight of the polymers measured by gel permeation chromatography (GPC) is preferably in the range of 10,000 or greater to 200,000 or less. Accordingly, there is a tendency that the storage stability of the ink is further improved. Here, the weight average molecular weight (Mw) in the specification can be measured as the weight average molecular weight in terms of polystyrene by a gel permeation chromatography (GPC) of an L7100 system manufactured by Hitachi Ltd.

As the polymers, 70% by mass or greater of the components thereof is preferably the polymer resulted from copolymerization of (meth)acrylate and (meth)acrylic acid. Thus, the fixation and glossiness of the ink tend to be further improved. At least one of alkyl(meth)acrylate having 1 to 24 carbon atoms and cyclic alkyl(meth)acrylate having 3 to 24 carbon atoms is preferably polymerized from monomer components of 70% by weight or more. As specific examples of the monomer components, which are not particularly limited, methyl(meth)acrylate, ethyl(meth)acrylate, propyl(meth)acrylate, n-butyl(meth)acrylate, isobutyl(meth)acrylate, pentyl(meth)acrylate, hexyl(meth)acrylate, 2-ethylhexyl(meth)acrylate, octyl(meth)acrylate, nonyl(meth)acrylate, decyl (meth)acrylate, t-butyl cyclohexyl(meth)acrylate, lauryl (meth)acrylate, isobornyl(meth)acrylate, cetyl(meth)acrylate, stearyl(meth)acrylate, isostearyl(meth)acrylate, tetramethylpiperidyl(meth)acrylate, dicyclopentanyl(meth)acrylate, dicyclopentenyl (meth)acrylate, dicyclopentenyloxy(meth)acrylate and behenyl(meth)acrylate are exemplified. In addition, as the other monomer components for polymerization, hydroxy(meth)acrylate, urethane(meth)acrylate and epoxy(meth)acrylate which have a hydroxyl group such as hydroxyethyl(meth)acrylate, hydroxypropyl (meth)acrylate and diethylene glycol(meth)acrylate can also be used.

2-3. Pigment Coated with Polymer

In addition, a pigment coated with the polymer among the polymer-dispersing type pigments, that is, a micro-encapsulated pigment is preferably used. Thus, the fixation, the glossiness and color reproducibility of the ink tend to be improved.

The pigment coated with the polymer is obtained by a phase inversion emulsification method. In other words, the above-described polymer is dissolved in an organic solvent such as methanol, ethanol, isopropanol, n-butanol, acetone, methyl ethyl ketone, and dibutyl ether. The pigment is added to the obtained solution, and then, kneading and dispersal treatment are performed by adding water and a neutralizing agent. By doing this, the dispersion of an oil-in-water type is adjusted. Then, the pigment which is coated with the polymer can be obtained as a water dispersion by removing the organic solvent from the obtained dispersion. For example, a ball mill, a roll mill, a bead mill, a high pressure homogenizer and high-speed stirring type disperser and the like can be used in the kneading and the dispersal treatment.

As the neutralizing agents, ethylamine, tertiary amines such as trimethylamine, lithium hydroxide, sodium hydroxide, potassium hydroxide and ammonia and the like are preferable. The pH of the obtained aqueous dispersion is preferably in the range of 6 to 10.

The polymer which coats the pigment having the weight average molecular weight of about 10,000 to 150,000 measured by GPC is preferable from the viewpoint of stably dispersing the pigment.

Among the pigments which are coated with a polymer, a color pigment which is coated with a polymer is preferable. The coloring property of the recorded material tends to be improved by using the color pigment.

3. Resin Dispersion

The ink composition used in the present embodiment preferably further includes a resin dispersion. There is a tendency that the resin dispersion can make the friction resistance and washing fastness of an image portion of the recorded material be more excellent since when the ink is dried, resins, and a resin and a pigment are fused together, respectively, and the pigment is fixed on the recording medium. The resin dispersion may be one in which a resin is dispersed in a dispersion medium as fine particles. As the resin dispersions, a dispersion, a suspension, an emulsion and the like can be used. Hereinafter, as an example of the resin dispersion, the emulsion (resin emulsion) will be described, but it is not limited to the resin emulsion, and the resin emulsion may be a resin dispersion. Among the resin emulsions, a urethane resin emulsion and an acrylic resin emulsion are preferable, and the urethane resin emulsion is more preferable. Thus, since the fixation of the ink becomes excellent, both the friction resistance and the washing fastness of the recorded material tend to be improved.

In the case where the resin emulsion is included in the ink composition, the resin emulsion sufficiently fixes the ink composition on a recording medium by forming a resin film on the recording medium and thus, the friction resistance of the recorded material becomes excellent. For this reason, the resin emulsion is preferably a thermoplastic resin. In particular, desired physical properties of the film are easily obtained since the urethane resin emulsion has a high flexibility of design.

The urethane resin emulsion is an emulsion which has a urethane bond in a molecule. Further, as the urethane resin emulsions, a polyether type urethane resin including an ether bond in a main chain, a polyester type urethane resin including an ester bond in the main chain, and a polycarbonate type urethane resin including a carbonate bond 2in the main chain in addition to the urethane bond can also be used.

Hereinafter, preferred physical properties of the resin emulsion will be described. In general, in the temperature range (the range of 15° C. to 35° C.) in which the ink jet recording is performed, the resin emulsion preferably has film-forming property. For this reason, the $T_g$ is preferably −10° C. or lower, and more preferably −15° C. or lower. In the case where the $T_g$ of the resin emulsion is in the above range, the fixation of the ink which is adhered to the recorded material becomes more excellent, and therefore, the friction resistance of the recorded material tends to become excellent. Moreover, the lower limit of the $T_g$, which is not particularly limited, may be −50° C. or higher.

Furthermore, the acid value of the resin emulsion is preferably in the range of 10 mg KOH/g to 100 mg KOH/g and more preferably in the range of 15 mg KOH/g to 50 mg KOH/g. When the acid value is 100 mg KOH/g or less, there is a tendency that the washing fastness of the recorded material can be excellently maintained. In addition, when the acid value is 10 mg KOH/g or higher, the storage stability of the ink, the coloring property and the fixation of the ink on a recording medium tend to become excellent. Moreover, the acid value in the specification is measured using AT610 manufactured by Kyoto Electronics Manufacturing Co., Ltd., and the values calculated by applying numeric values to the following formula are adopted.

$$\text{Acid value (mg/g)} = (EP1-BL1) \times FA1 \times C1 \times K1/\text{SIZE}$$

In the formula, EP1 represents a titration amount (mL), BL1 represents a blank value (0.0 mL), FA1 represents a factor of titrant (1.00), C1 represents a concentration conversion value (5.611 mg/mL) (amount corresponding to 1 mL KOH having a concentration of 0.1 mol/L), K1 represents a coefficient (1), and SIZE represents the amount of a sample (g).

In addition, the resin emulsion preferably has the elongation at a break in the range of 500% to 1,200%, and preferably has the elastic modulus in the range of 20 MPa to 400 MPa. When the elongation at the break and the elastic modulus are in the above range, even in the case of printing on a cloth which easily expands or contracts among cloths, there is a tendency that the cracking and the breaking of an image, that is, of an ink layer can be suppressed, and the friction resistance and the washing fastness of the recorded material tend to become excellent.

Here, after preparing a film having a thickness of about 60 μm, the elongation at the break in the specification can be measured under the conditions of a tensile test gauge length of 20 mm and a tensile speed of 100 mm/min. In addition, in a measurement of the elastic modulus in the specification, after preparing a film having a thickness of about 60 μm and forming a dumbbell specimen having a parallel portion width of 10 mm and a length of 40 mm, a tensile elasticity can be measured based on JIS K7161:1994.

Moreover, to be more specific, the JIS K7161:1994 corresponds to the international standard ISO 527-1:1993, the title thereof is a test method for plastic-tensile property, and the standard defines the general principles for measuring the tensile property of a plastic and a plastic composite under the predetermined conditions.

D50 of the resin emulsion is preferably in the range of 30 nm to 300 nm, and more preferably in the range of 80 nm to 300 nm. When D50 is in the above range, the resin emulsion particles in the ink composition can be uniformly dispersed. The lower limit value of D50 is more preferably 100 nm. When the D50 is in the above range, the friction resistance of the recorded material tends to become more excellent.

From the viewpoint of the physical properties of the resin emulsion described above, as commercially available products of the urethane resin emulsion, which are not particularly limited, Suncure 2710 (product name, manufactured by Lubrizol Corp.), Permarin UA-150 (product name, manufactured by Sanyo Chemical Industries, Ltd.), Superflex 460, 470, 610, 700 (hereinbefore, product names, all manufactured by Dai-ichi Kogyo Seiyaku Co., Ltd.), NeoRez R-9660, R-9637, R-940 (hereinbefore, product names, all manufactured by Kusumoto Chemicals, Ltd.), Adeka Bontighter HUX-380, 290K (hereinbefore, product names, all manufactured by Adeka Co., Ltd.), Takelac (registered trademark) W-605, W-635, WS-6021 (hereinbefore, product names, all manufactured by Mitsui Chemicals, Inc.), Polyether (product name, manufactured by Taisei Finechemical Co., Ltd., $T_g = 20°$ C.) are preferably exemplified.

The urethane-based resin may be used alone or two or more kinds may be used in combination.

In addition, the ink composition used in the embodiment preferably includes a resin emulsion other than the urethane resin emulsion. Among the resin emulsions, an anionic resin emulsion is preferable since the anionic resin emulsion can effectively prevent a resin from aggregating. As the anionic resin emulsions, which are not particularly limited, a homopolymer or a copolymer of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinylpyrrolidone, vinyl pyridine, vinylcarbazole, vinyl imidazole and vinylidene chloride, a fluororesin and a natural resin are exemplified. Among these, at least one of a (meth)acrylic resin and a styrene-(meth)acrylic acid copolymer resin is preferable, at least one of an acrylic resin and a styrene-acrylic acid copolymer resin is more preferable and a styrene-acrylic acid copolymer resin is further more preferable. Moreover, the copolymers may be any form of a random copolymer, a block copolymer, an alternating copolymer and a graft copolymer.

As resin emulsions other than the urethane resin emulsion, those obtained by known materials and the preparing method may be also used, and commercially available products may be also used. As the commercially available products, which are not particularly limited, Mowinyl 966A (product name, manufactured by Nippon Synthetic Chemicals Industry Co., Ltd, acrylic resin emulsion), Microgel E-1002, Microgel E-5002 (hereinbefore, product names, both manufactured by Nippon Paint Co., Ltd.), Voncoat 4001, Voncoat 5454 (hereinbefore, product names, both manufactured by DIC Corp.), SAE1014 (product name, manufactured by Nippon Zeon Corp.), Saibinol SK-200 (product name, manufactured by (SAIDEN CHEMICAL INDUSTRY CO., LTD.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, JONCRYL 7610 (hereinbefore, product names, all manufactured by BASF Corp.), and NK binder R-5HN (product name, manufactured by Shin-Nakamura Chemical Co., acrylic resin emulsion, 44% solid content) are exemplified. Among these, Mowinyl 966A which is an acrylic resin emulsion is preferable since Mowinyl 966A sufficiently satisfies desirable physical properties of the resin emulsion described above.

Resin emulsions other than the urethane resin emulsion may be used alone or two or more kinds may be used in combination.

Here, the content of the resin in the resin emulsion will be described. The lower limit of the content of the resin in the resin emulsion is preferably 3% by mass or greater, more preferably 4% by mass or greater, and still more preferably 5% by mass or greater with respect to the total mass (100% by mass) of a ink composition. The upper limit is preferably 15% by mass or less, more preferably 13% by mass or less, and still more preferably 10% by mass or less. When the content is in the above range, the friction resistance and the washing fastness of the recorded material tend to become excellent, and there are tendencies that the long-term storage stability of the ink composition is excellent, and particularly, the viscosity of the ink composition can be lowered.

4. Cyclic Amide Compound

The ink composition used in the embodiment preferably further includes a cyclic amide compound. The cyclic amide compound has a function for improving the solubility of a lactic acid ester compound in water. Therefore, since when the ink composition also includes a cyclic amide compound together with a lactic acid ester compound, a solubility of a urethane resin (emulsion) increases, and the storage stability, particularly, the storage stability at high temperatures tends to become more excellent.

In addition, since the cyclic amide compound also has the moisture retaining function, the cyclic amide compound can prevent aggregation and solidification caused by evaporation of water in a urethane resin (emulsion), other resins (polymer) and a pigment during a storage of an ink. Thus, clogging near the nozzle of a head during an ink jet recording can be prevented, and the discharging stability of the ink composition tends to become excellent.

As specific examples of the cyclic amide compound, which are not particularly limited, 2-pyrrolidone, N-methyl-2-pyrrolidone and N-ethyl-2-pyrrolidone are exemplified. Among these, 2-pyrrolidone is preferable since solubility with respect to a resin (polymer) is strengthened further and the storage stability, particularly, the storage stability at high temperature becomes even more excellent.

The cyclic amide compound may be used alone or two or more kinds may be used in combination.

The content of the cyclic amide compound is preferably in the range of 0.5% by mass to 5% by mass, and more preferably in the range of 1% by mass to 3% by mass with respect to the total mass (100% by mass) of an ink composition. When the content is in the above range, the friction resistance and the washing fastness of the recorded material caused by the long-term storage stability of an ink, the discharging stability of an ink and the excellent fixation of an ink become more excellent.

5. Water-Soluble Solvent

The ink composition used in the embodiment can include a water-soluble solvent and preferably includes water. As the aqueous solvents, water and water-soluble organic solvents are exemplified. As water, which is not particularly limited, pure water such as ion exchange water, ultrafiltration water, reverse osmosis water and distilled water or ultrapure water can be used. The content of the water, which is not particularly limited, may be suitably determined as necessary, and may be preferably in the range of 20% by mass to 80% by mass with respect to the total mass (100% by mass) of an ink composition in order to adjust the viscosity of the ink composition to be in a suitable range.

Moreover, to avoid duplication, various additives (components) which will be described below do not include the cyclic amide compound.

6. Penetrating Agent

Since the ink composition used in the embodiment further promotes the aqueous solvent which is a component thereof penetrating into a recording medium, the ink composition may further contain a penetrating agent. There is a tendency that the recorded material in which bleeding of an image is small can be obtained by fast penetration of the aqueous solvent into a cloth.

As the penetrating agents, alkyl ethers (glycol ethers) of polyhydric alcohols and 1,2-alkyldiols are preferably exemplified. As the glycol ethers, which are not limited to the following, ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether and dipropylene glycol monobutyl ether are exemplified. In addition, as the 1,2-alkyldiols, which are not particularly limited, 1,2-pentanediol and 1,2-hexanediol are exemplified. Diols having a straight-chain hydrocarbon such as 1,3-propanediol, 1,4-butanediol, 1,5-pentanediol, 1,6-hexanediol, 1,7-heptanediol and 1,8-octanediol in addition to these can also be exemplified.

The penetrating agent may be used alone or two or more kinds may be used in combination.

The content of the penetrating agent is preferably in the range of 0.1% by mass to 20% by mass, and more preferably in the range of 0.5% by mass to 10% by mass with respect to the total mass (100% by mass) of an ink composition. When the content is 0.1% by mass or more, there is a tendency that the penetration into the cloth of the ink composition increases. In contrast, when the content is 20% by mass or less, there is a tendency that generation of bleeding in the image can be prevented, and the viscosity of the ink composition can be made not to be high.

7. Moisturizing Agent

The ink composition used in the embodiment may further include a moisturizing agent (wetting agent). The moisturizing agent can be used without being particularly limited as long as it is generally used in the ink jet ink. A moisturizing agent having a high boiling point of which the boiling point is preferably 180° C. or higher, and more preferably 200° C. or higher may be used. In the case where the boiling point is in the above range, excellent water holding property and wetting property can be applied to the ink composition.

As specific examples of the moisturizing agent having a high boiling point, which are not particularly limited, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a number average molecular weight of 2000 or less, 1,3-propylene glycol, isopropylene glycol, isobutylene glycol, glycerin, meso-erythritol and pentaerythritol are exemplified.

The moisturizing agent may be used alone or two or more kinds may be used in combination. When the ink composition includes the moisturizing agent having a high boiling point, there is a tendency that fluidity and redispersibility can be maintained for a long period of time even if the ink composition is left in a state where the pigment ink is exposed to air in an open state. Furthermore, in such an ink composition, since the clogging of the nozzle is unlikely to occur while printing is performed using the ink jet recording apparatus or at the time of being restarted after an interruption, the discharging stability of the ink composition tends to become excellent. The content of the moisturizing agent is not particularly limited and may be suitably determined as necessary.

Moreover, as described above, in the case where the ink composition includes a cyclic amide compound, since the cyclic amide compound has a moisture retaining function, the cyclic amide compound can be used as the moisturizing agent.

8. Surfactant

The ink composition used in the embodiment may include a surfactant. As the surfactants, at least one of an acetylene glycol-based surfactant, an acetylene alcohol-based surfactant and a polysiloxane-based surfactant is preferable. When the ink composition includes these surfactants, the drying property of the ink composition adhering to a cloth becomes more excellent, and high-speed printing tends to become possible.

Among these, polysiloxane-based surfactants are more preferable since the solubility in the ink is increased and foreign matter is less likely to be generated.

As the acetylene glycol-based surfactants and the acetylene alcohol-based surfactant, which are not particularly limited, one or more kinds selected from alkylene oxide adducts of 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and 2,4-dimethyl-5-decyne-4-ol are preferable. These can be available as commercially available products such as E series (product name, manufactured by Air Products Japan, Inc.) of Olfine 104 series and Olfine E1010, Surfynol 465 and Surfynol 61 (product names, manufactured by Nissin Chemical Industry Co., Ltd.).

In addition, as the polysiloxane-based surfactants, BYK-347 and BYK-348 (product names, manufactured by BYK Japan KK) are exemplified.

The content of the surfactant is preferably in the range of 0.1% by mass to 3% by mass with respect to the total mass (100% by mass) of the ink composition.

9. Other Components

In the ink composition used in the embodiment, various additives such as a moisturizing agent, a solubilizer, a seepage control agent, a viscosity modifier, a pH adjusting agent, an antioxidant, a preservative, an antifungal agent, a corrosion inhibitor and a chelating agent for capturing metal ions which affect dispersion can be suitably added in order to maintain excellent storage stability thereof and excellent discharge stability from the head, to improve anti-clogging performance or to prevent deterioration of the ink.

4. Ink Jet Recording Apparatus

The ink jet recording apparatus of the embodiment is not particularly limited as long as recording is performed by the ink jet recording method for printing pigment, and may have the same configuration as those in the related art as long as it has the configuration described above.

EXAMPLES

Hereinafter, the invention will be more specifically described using Examples and Comparative Examples. The invention is not limited to these Examples.

1. Material for Ink Composition

The main material for the ink composition used in the following Examples and Comparative Examples are as follows.

Coloring Material
  Cyan pigment (C. I. Pigment Blue 15:3 manufactured by Clariant Co., Ltd.)
  Cyan pigment (C. I. Disperse Blue 60 manufactured by DyStar Colours Distribution GmbH)
Resin Emulsion
  Takelac WS-6021 (product name, manufactured by Mitsui Chemicals Polyurethanes, Inc., 30% solid content, urethane resin emulsion)
Dispersant
  DEMOL NL (product name, manufactured by Kao Chemical Co., 41% solid content)
Organic Solvent
  Glycerin
  Triethylene glycol
  Triethylene glycol monobutyl ether
Silicone-Based Surfactant
  BYK-348 (product name, manufactured by BYK Co., Ltd.)

2. Preparation of Ink Composition

By mixing according to the composition (% by mass) shown in Table 1 and sufficiently stirring, ink compositions 1 and 3 were obtained.

TABLE 1

| Ink No. | 1 | 2 | 3 |
|---|---|---|---|
| Cyan pigment (C.I. Pigment Blue 15:3 manufactured by Clariant Co., Ltd.) | 5.00 | 3.00 | — |
| Cyan pigment (C.I. Disperse Blue 60 manufactured by DyStar Colours Distribution GmbH) | — | — | 5 |
| Takelac WS-6021 (as solid content) | 6.00 | 3.60 | — |
| Dispersion DEMOL NL (41% solid content) | 1.20 | 0.72 | — |
| Glycerin | 8.00 | 8.00 | 8.00 |
| Triethylene glycol | 3.00 | 3.00 | 3.00 |
| Triethylene glycol monobutyl ether | 1.00 | 1.00 | 1.00 |
| BYK-348 | 0.30 | 0.30 | 0.30 |
| Ion exchange water | balance About 11% solid content | balance About 7% solid content | balance Dye ink |

3. Cloth

As the cloth of 100% cotton, texture of T-shirts (white, 5 ounces) manufactured by HANES Inc. was used. In addition, as the cloth of cotton-polyester blended fibers, texture of T-shirts (white) manufactured by HANES Inc. and blended fibers (75% cotton and 25% polyester) were used. Furthermore, as cloth of 100% polyester, texture (100% polyester, white, 4.1 ounces) of T-shirts made of polyester was used.

4. Ink Jet Recording Apparatus

A printer SC-530650 (manufactured by Seiko Epson Corporation) which was remodeled was used (hereinafter, referred to as "remodeled SC-530650 printer"). The remodeled portions are as follows. A discharging mechanism was provided, and a recording medium made of cloth was made to be supportable and transportable.

The head at the time of printing having a nozzle density of one nozzle array of 360 dpi was used. In addition, in the discharging mechanism, using the driving pulses as shown in FIG. 2, the drive pulse was applied to a piezoelectric element provided to each nozzle and thus, ink was discharged from the nozzle. One recording cycle (frequency) was set to 7.2 kHz, the discharging frequency at the time of applying three driving pulses PW1 to PW3 of one recording cycle to the piezoelectric element was set to 21.6 kHz (average). In addition, the carriage speed was adjusted to set the dot formation density in the main scanning direction of each array. Furthermore, the gradients $\theta 12$, $\theta 22$ and $\theta 32$ of the charging elements P13, P23 and P33 of the driving pulses PW1, PW2 and PW3 were changed to adjust the discharging speed. By adjusting the potential difference of the charging elements P13, P23 and P33, the discharging amount of the ink droplet can be adjusted.

The distance from the nozzle opening to a cloth was adjusted by raising or lowering the position of the recording medium support portion. In addition, the passage time during which ink droplets passed through the distance in the range of 0.5 mm to 1.0 mm in the direction of the cloth from the nozzle opening was measured by capturing an image with a high speed camera from a side of the nozzle surface, and the average discharging speed V was calculated from the measured values.

5. Ink Jet Recording Method

Examples 1 to 10, Comparative Examples 1 to 8, and Reference Examples 1 to 2

Using the remodeled SC-S30650 printer, any one of the ink compositions 1 to 3 which was prepared as described above was discharged under the printing condition of each example shown in Table 2 by the ink jet recording method, and 20×20 cm patterns adhered to the cloth which was set to the A4 size.

The cloth onto which the ink composition adhered was heat-treated at 160° C. for 1 minute using a heat press machine to fix the ink composition on the cloth. In addition, in Comparative Example 7, the cloth was left in an oven at 160° C. for 5 minutes to dry, without using the heat press. In this manner, the recorded material in which an image was formed (ink was printed) on the cloth was prepared. At this time, the following evaluation was performed with respect to the obtained recorded material.

6. Evaluation

Adhered Amount of the Ink (Mg/Inch$^2$)

The adhered amount of the ink was obtained from the dot formation density by the following formula (except for Example 8 and Comparative Example 6)

Adhered amount of the ink (mg/inch$^2$)=amount of the ink of the ink droplet (ng)×dot formation density in the horizontal direction (dpi)×dot formation density in the vertical direction (dpi)×2×10$^{-6}$ Contamination of Cloth A pattern prepared as described above was visually observed. The contamination of cloth was evaluated according to the following evaluation criteria.

Evaluation Criteria

B: Contamination considered to be transported to the base portion of cloth from the collapsed fluff was not observed.

C: Contamination considered to be transported to the base portion of cloth from the collapsed fluff was slightly observed.

D: Contamination considered to be transported to the base portion of cloth from the collapsed fluff was greatly observed.

Concealing Property of Image

A pattern of a sample which was prepared in the evaluation of the contamination of a cloth was visually observed. The concealing property of an image was evaluated according to the following evaluation criteria.

Evaluation Criteria

B: When observed from the top of a pattern, white texture was not seen through.

C: When observed from the top of a pattern, white texture was slightly seen through.

D: When observed from the top of a pattern, white texture was clearly seen through.

Printing Speed

The necessary time for printing one sheet in other Examples compared with in Example 1 was measured. The printing speed was evaluated according to the following evaluation criteria.

Evaluation Criteria

O: Fewer than two times

X: Two times or more

Drying Speed

After printing a pattern according to the same method as in the evaluation of the contamination of a cloth, a solid image (ink droplet of 5 ng, dot density of 2880×1440 dpi) of 10×10 cm was further printed inside the pattern by using magenta ink without fixing by a heat press. The time interval between cyan ink printing and magenta ink printing was set to be in the range of 30 seconds to 1 minute. The bleeding in a boundary of the cyan pattern and magenta pattern after printing was visually observed. Moreover, the drying speed was evaluated according to the following evaluation criteria. As the magenta ink, an ink in which Pigment Red 122 (manufactured by Clariant Co., Ltd.) of 5% by mass instead of cyan pigment in the ink composition 1 was included was adjusted to be used.

Evaluation Criteria

B: no bleeding

C: slight bleeding

D: bleeding

TABLE 2

|  | Example 1 | Example 2 | Example 3 | Example 4 | Example 5 |
|---|---|---|---|---|---|
| Ink No. | 1 | 1 | 1 | 2 | 1 |
| Average discharging speed m/s | 5 | 10 | 12 | 5 | 5 |
| Amount of ink of ink droplet ng | 5 | 5 | 3 | 5 | 9 |
| Distance between nozzle surface and cloth mm | 2 | 2 | 2 | 4 | 2 |

TABLE 2-continued

|  | | | | | |
|---|---|---|---|---|---|
| Heat press 160° C. × 1 minute | Performed | Performed | Performed | Performed | Performed |
| Type of cloth | 100% cotton | 100% cotton | 100% cotton | 100% cotton | 100% cotton |
| Dot formation density dpi | 2880 × 1440 | 2880 × 1440 | 2880 × 1440 | 2880 × 1440 | 1440 × 1440 |
| Adhered amount of the ink mg/inch$^2$ | 20.7 | 20.7 | 12.4 | 20.7 | 18.7 |
| Contamination of cloth | B | B | B | B | B |
| Concealing property of image | B | B | C | C | B |
| Printing speed | B | B | B | B | B |
| Drying speed | B | B | B | B | B |

|  | Example 6 | Example 7 | Example 8 | Example 9 | Example 10 |
|---|---|---|---|---|---|
| Ink No. | 1 | 1 | 1 | 1 | 1 |
| Average discharging speed m/s | 5 | 5 | 5 | 5 | 5 |
| Amount of ink of ink droplet ng | 5 | 5 | 5 | 5 | 5 |
| Distance between nozzle surface and cloth mm | 4 | 1 | 1 | 2 | 2 |
| Heat press 160° C. × 1 minute | Performed | Performed | Performed | Not performed | Performed |
| Type of cloth | 100% cotton | 100% cotton | 100% cotton | 100% cotton | 100% polyester |
| Dot formation density dpi | 2880 × 1440 | 2880 × 1440 | 2880 × 1440 | 2880 × 1440 | 2880 × 1440 |
| Adhered amount of the ink mg/inch$^2$ | 20.7 | 20.7 | 70 | 20.7 | 20.7 |
| Contamination of cloth | C | B | B | B | B |
| Concealing property of image | B | B | B | B | B |
| Printing speed | B | B | D | B | B |
| Drying speed | B | B | C | B | B |

|  | Comparative Example 1 | Comparative Example 2 | Comparative Example 3 | Comparative Example 4 | Comparative Example 5 |
|---|---|---|---|---|---|
| Ink No. | 1 | 2 | 1 | 1 | 1 |
| Average discharging speed m/s | 3 | 3 | 5 | 3 | 5 |
| Amount of ink of ink droplet ng | 5 | 5 | 13 | 13 | 13 |
| Distance between nozzle surface and cloth mm | 2 | 2 | 2 | 2 | 2 |
| Heat press 160° C. × 1 minute | Performed | Performed | Performed | Performed | Performed |
| Type of cloth | 100% cotton | 100% cotton | 100% cotton | 100% cotton | 100% cotton |
| Dot formation density dpi | 2880 × 1440 | 2880 × 1440 | 2160 × 720 | 2160 × 720 | 2160 × 360 |
| Adhered amount of the ink mg/inch$^2$ | 20.7 | 20.7 | 20.2 | 20.2 | 10.1 |
| Contamination of cloth | D | D | B | B | B |
| Concealing property of image | B | C | B | B | D |
| Printing speed | B | B | B | B | B |
| Drying speed | B | B | D | D | B |

|  | Comparative Example 6 | Comparative Example 7 | Comparative Example 8 | Reference Example 1 | Reference Example 2 |
|---|---|---|---|---|---|
| Ink No. | 1 | 1 | 1 | 3 | 3 |
| Average discharging speed m/s | 3 | 3 | 3 | 5 | 3 |
| Amount of ink of ink droplet ng | 5 | 5 | 5 | 5 | 5 |
| Distance between nozzle surface and cloth mm | 2 | 2 | 1 | 2 | 2 |
| Heat press 160° C. × 1 minute | Performed | Performed | Performed | Performed | Performed |
| Type of cloth | 100% cotton | Cotton-polyester blended fibers | 100% cotton | 100% cotton | 100% cotton |
| Dot formation density dpi | 2880 × 1440 | 2880 × 1440 | 2880 × 1440 | 2880 × 1440 | 2880 × 1440 |
| Adhered amount of the ink mg/inch$^2$ | 103.5 | 20.7 | 20.7 | 20.7 | 20.7 |
| Contamination of cloth | B | D | D | B | B |
| Concealing property of image | B | B | B | C | C |
| Printing speed | D | B | B | B | B |
| Drying speed | D | B | B | B | B |

From the results above, it was found that in Examples 1 to 10 using the ink jet recording method for printing a pigment which satisfies requirements of the invention, the contamination of a cloth is unlikely to occur, the concealing property of an image is excellent, and the drying speed is also fast.

Among Examples, in Example 6 in which the distance between the nozzle surface and the cloth was set to 4 mm, the contamination of a cloth was slightly inferior, and it is presumably because the flying distance of the ink droplets was increased, and thus, the number of ink droplets which cannot land on the base portion of the cloth due to air resistance was increased. In contrast, in Example 4, the distance between the nozzle surface and the cloth was the same as in Example 6. However, the contamination of the cloth was the same as in Example 1, and the concealing property of an image is slightly inferior. This is presumably because, since the ink No. 2 used in Example 4 has a lower solid content of the ink than in the ink No. 1, the ink components which become the contamination of a cloth were small.

Example 8 and Comparative Example 6 are examples in which the adhered amount of the ink was increased by increasing the number of passes, and since the adhered amount of the ink was increased by forming dots several times at the same position on the cloth, the apparent dot formation density becomes the same as in Example 1.

In Examples 7 and 8 and Comparative Example 8, the distance between the nozzle surface and the cloth was set to 1 mm, and among these, in Example 8, since the adhered amount of the ink was large, the cloth expanded due to the adhesion of the ink during printing, and contact with the head occurred. However, since the contamination of the cloth due to collapse of the fluff did not occur, it is excellent in the evaluation of the contamination of the cloth.

Example 10 is an example in which 100% polyester was used as the type of cloth. It was thought that since the fluff of the cloth surface is small, the contamination of the cloth due to collapse of the fluff does not occur. However, Examples 1 to 9 were more excellent than Example 10 in which the cloth was polyester in terms of texture. In contrast, in Comparative Example 7 in which cloth of cotton-polyester blended fibers was used as the cloth, the contamination of the cloth occurred.

The ink composition 3 including dye needs a chemical treatment or a vapor heat treatment to fix the dye. However, in Reference Examples 1 and 2, discoloration was performed by washing since only a heat press was performed as a treatment after printing. In addition, it was found that the concealing property is inferior.

On the other hand, it was found that in Comparative Examples 1, 2, 7 and 8 in which the average discharging speed was low, the contamination of the cloth occurred. In addition, it was found that in Comparative Example 4 in which the average discharging speed was low, and the amount of the ink of the ink droplets was large, the drying speed was low, and in Comparative Example 6 in which the adhered amount of the ink was large, the printing speed and the drying speed were low. Furthermore, it was found that in Comparative Example 3 in which the amount of the ink of the ink droplets was large, the drying speed was low, and in Comparative Example 5 in which the amount of the ink of the ink droplets was large and the dot formation density was low, the concealing property of an image was poor.

In Example 9, the contamination of the cloth was excellent. However, it was observed that fluff was erect on the surface of the cloth in the portion at which an image of recorded material was recorded, and a little color was attached to fuzz.

The ink jet recording method of the invention is industrially applicable as a method which records an ink composition on a cloth.

The entire disclosure of Japanese Patent Application No.: 2013-036776, filed Feb. 27, 2013 is expressly incorporated by reference herein.

What is claimed is:

1. An ink jet recording method for printing a pigment, wherein a pigment printing ink composition including at least one pigment as a colorant is discharged from a nozzle opening as an ink droplet having an amount of ink ranging from 5 ng to 9 ng with an average discharging speed V ranging from 5 m/s to 15 m/s at a distance in the range of 0.5 mm to 1.0 mm in the direction from the nozzle opening to cloth, to which the pigment printing ink composition is adhered;
wherein a content of water is 20% by mass or more with respect to the total mass of the ink composition.

2. The ink jet recording method for printing a pigment according to claim 1, wherein the distance between the nozzle opening and the cloth is in the range of 2.0 mm to 5.0 mm.

3. The ink jet recording method for printing a pigment according to claim 1,
wherein the average discharging speed V is in the range of 5 m/s to 10 m/s.

4. The ink jet recording method for printing a pigment according to claim 1, wherein the solid content of the pigment printing ink composition is 8% by mass or greater.

5. The ink jet recording method for printing a pigment according to claim 1, wherein the pigment printing ink composition includes a pigment, and a resin dispersion.

6. The ink jet recording method for printing a pigment according to claim 1, wherein the cloth includes cotton or a cotton blend.

7. The ink jet recording method for printing a pigment according to claim 1, wherein after the pigment printing ink composition is adhered to the cloth, the cloth to which the pigment printing ink composition is adhered is heat-treated.

8. The ink jet recording method for printing a pigment according to claim 7, further comprising using a heating temperature of 150° C. or higher when the cloth is heated.

9. The ink jet recording method for printing a pigment according to claim 1, wherein the amount of the pigment printing ink composition adhering to the cloth is in the range of 10 mg/inch$^2$ to 70 mg/inch$^2$.

10. The ink jet recording method for printing a pigment according to claim 1, wherein a dot formation density of the pigment printing ink composition on the cloth is 720 dpi or greater×720 dpi or greater.

11. The ink jet recording method for printing a pigment according to claim 1, wherein the pigment printing ink composition is any one of a color ink including at least color pigment as a pigment and a black ink including at least carbon black pigment as a pigment.

12. An ink jet recording apparatus, wherein recording is performed by the ink jet recording method for printing a pigment according to claim 1.

13. The ink jet recording method for printing a pigment according to claim 1, wherein a content of the pigment is from 0.5 to 15% by mass with respect to the total mass of ink composition.

14. The ink jet recording method for printing a pigment according to claim 5, wherein a content of resin of the resin dispersion is from 3 to 15% by mass with respect to the total mass of ink composition.

15. The ink jet recording method for printing a pigment according to claim 1, wherein the pigment printing ink composition comprise a water soluble organic solvent.

16. The ink jet recording method for printing a pigment according to claim 1, wherein a solid content of the pigment printing ink composition is from 8 to 20% by mass with respect to the total mass of ink composition.

* * * * *